(12) United States Patent
Wiesenberg

(10) Patent No.: US 7,973,970 B2
(45) Date of Patent: *Jul. 5, 2011

(54) PREVENTING ARTIFACTS THAT MAY BE PRODUCED WHEN BOTTLING PDL FILES CONVERTED FROM RASTER IMAGES

(75) Inventor: Raphael Wiesenberg, Ramat Gan (IL)

(73) Assignee: Ether Visuals LLC, Las Vegas, NV (US)

( * ) Notice: Subject to any disclaimer, the term of this patent is extended or adjusted under 35 U.S.C. 154(b) by 59 days.

This patent is subject to a terminal disclaimer.

(21) Appl. No.: 12/426,881

(22) Filed: Apr. 20, 2009

(65) Prior Publication Data

US 2010/0171969 A1 Jul. 8, 2010

Related U.S. Application Data

(63) Continuation of application No. 11/468,890, filed on Aug. 31, 2006, now Pat. No. 7,522,310, which is a continuation of application No. 11/274,369, filed on Nov. 14, 2005, now Pat. No. 7,221,481, which is a continuation of application No. 09/635,244, filed on Aug. 9, 2000, now Pat. No. 6,987,584.

(51) Int. Cl.
H04N 1/56 (2006.01)
H04N 1/58 (2006.01)
G06K 15/00 (2006.01)

(52) U.S. Cl. .................. 358/1.9; 358/3.26; 358/530

(58) Field of Classification Search ............... 358/1.9, 358/2.1, 3.24, 3.26, 1.13, 1.18, 530, 537, 358/538; 382/162, 164, 180, 275; 715/204, 715/209, 243, 247, 273, 275–277
See application file for complete search history.

(56) References Cited

U.S. PATENT DOCUMENTS

| | | | |
|---|---|---|---|
| 5,790,708 A | 8/1998 | Delean | |
| 5,930,385 A | 7/1999 | Fujimoto et al. | |
| 6,055,064 A * | 4/2000 | Lifshitz et al. | 358/1.9 |
| 6,295,133 B1 | 9/2001 | Bloomquist et al. | |
| 6,594,034 B1 | 7/2003 | Bloomquist et al. | |
| 6,661,919 B2 | 12/2003 | Nicholson et al. | |
| 7,317,543 B2 * | 1/2008 | Gnutzmann | 358/1.9 |
| 2002/0054398 A1 | 5/2002 | Bloomquist et al. | |

* cited by examiner

Primary Examiner — Scott A Rogers

(57) ABSTRACT

The present invention eliminates undesirable image defects caused during the preparation of pages for printing and folding, known as the bottling process. This is achieved by analyzing image characteristics, sorting out the image according to its characteristics, where necessary vectoring and editing the vectored characteristics, and finally completing the file conversion from a raster image to a Page Description Language (PDL) image. A first embodiment of the invention divides an image into small segments. A second embodiment of the invention enlarges existing image segments. A third embodiment of the invention enlarges existing image segments and sorts image segments according to their color attribute of transparency. A fourth embodiment of the invention divides a part of an image segment to small segments.

21 Claims, 6 Drawing Sheets

*Shapes before rotation*

*Shapes before rotation*

Shapes after rotation

Shapes after enlargement

*Color and Transparency*
| INK : NO. | NAME | % COVERAGE | TRANSPARENCY |
|---|---|---|---|
| 1 | CYAN | 100 | 0 |
| 2 | MAGENTA | 2 | 1 |
| 3 | YELLOW | 0 | 0 |
| 4 | BLACK | 1 | 1 |
|  | TOTAL | 100 | 2 |
FIG. 6
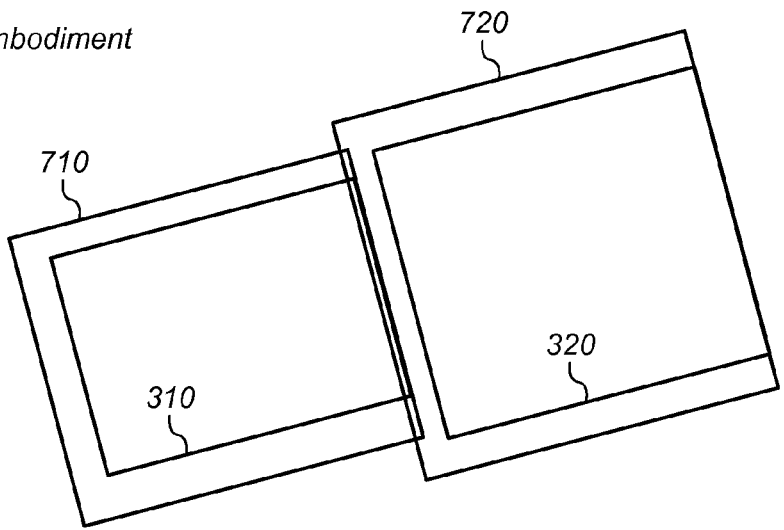
FIG. 7A
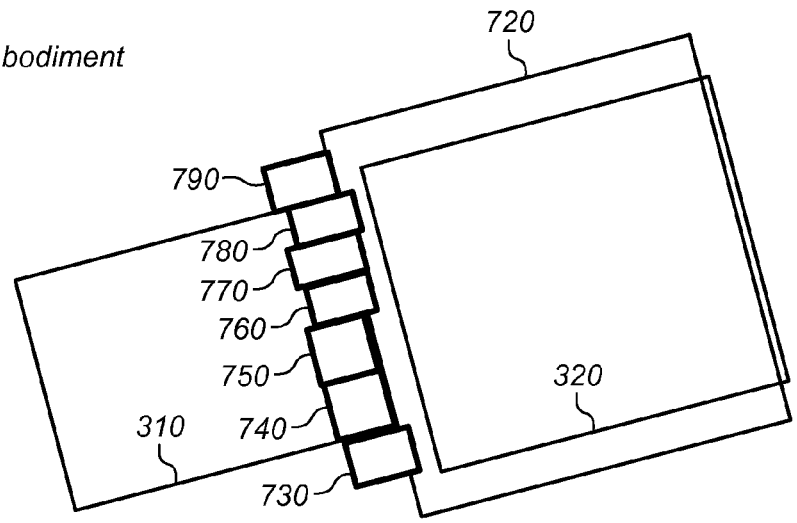
FIG. 7B

PREVENTING ARTIFACTS THAT MAY BE PRODUCED WHEN BOTTLING PDL FILES CONVERTED FROM RASTER IMAGES

CROSS-REFERENCE TO RELATED APPLICATIONS:

This patent application is a Continuation of U.S. application Ser. No. 11/468,890, filed on Aug. 31, 2006, now U.S. Patent No. 7,522,310, which is a Continuation of U.S. application Ser. No. 11/274,369, filed on Nov. 14, 2005, now U.S. Pat. No. 7,221,481, which is a Continuation of U.S. application Ser. No. 09/635,244, filed on Aug. 9, 2000, now U.S. Pat. No. 6,987,584, all of which are incorporated by reference herein in their entireties.

FIELD AND BACKGROUND OF THE INVENTION

The invention relates to the field of Pre-Press or Graphic Arts that involves the preparation of images for print. This industry nowadays usually employs digital computers and it processes images coded as files of digital data. These image files usually fall into two categories, raster files and vector files. Raster files describe an image as a two dimensional array of picture elements called pixels. A pixel contains the attribute of image color at its particular location within the image. Usually all pixel comprising an image are assumed to be rectangular, and of the same dimensions. Vector files describe an image in terms of various geometrical shapes such as a line segment or a polygon. The specification of these shapes contains the attributes of color of each shape, and its dimensions. A well-known page description language (PDL) language comprising vector description of images is Postscript.

It is a common practice in the industry to convert images between raster and vector formats. The process of conversion of a file from Postscript to a raster format is often called RIP (Raster Image Processing). The process of conversion from raster to Postscript is herein called Ceps2Ps.

The target of a Pre-Press image processing activity is, by definition, the conversion of the image from digital form to an analogue form of ink or toner on paper or other substrate. A printing press is a common device for printing ink on paper, and so it is often stands at the end of a Pre-Press activity. The press often produces large sheets of paper on each of which several distinct images are printed. Post-press activity is then often required to cut, fold and bind these sheets of paper to form printed booklets. One such large sheet of paper can be turned by this Post-press activity to a booklet of several pages each containing one of these distinct images as the printed content of the page.

It is a known by-product of the Post-press process that the distinct images get rotated one in respect to the other by a small angle. When a press produces a sheet of paper with several distinct images that are not rotated one in respect to the other, they will appear rotated in the resulting booklet. This byproduct of the Post-press process is sometimes and herein called 'bottling'. It is a common practice to correct the image orientation using the Pre-press process to correct for bottling that is expected to occur at Post-press, so that correct orientation would be observed for the booklets. The image processing function of rotation is generally well known and commonly used in the art.

It, thus, may happen that an image coded in some raster format needs to be passed through the following Pre-press process. At a first step, the raster image is converted to Postscript format. Then, at a second step, the Postscript coded image is rotated by a small angle. Finally, at a third step, a RIP operation produces raster pixels for printing.

It is common for an image to contain straight line segment elements that are either precisely horizontal or precisely vertical, i.e. line segments that exactly parallel to either horizontal or vertical edges of the page on which the are printed. Thus its is common for the second step of rotation to produce line segments that form a small angle to either vertical or horizontal direction. These segments are called typical bottling segments' herein.

An inherent and common behavior of the RIP has been observed when it converts typical bottling segments to raster format as follows. Undesirable artifacts are produced that appear as cracks within the image and between typical bottling segments.

It is not desirable to prevent the appearance of the undesirable artifacts by introducing changes in the behavior of the RIP, because a corrected RIP would behave differently than other RIP products in the industry, and it is required that all RIP products within the industry behave in a similar fashion. Otherwise the industry will prefer to avoid using the Postscript format altogether.

The present invention seeks to prevent the appearance of the undesirable artifacts by introducing changes to the Ceps2Ps operation.

The invention is suitable for a particular Ceps2Ps method of operation as follows. Ceps2 ps divides a raster image into segments of like color. Each segment is then described as a geometrical shape such as a polygon in the syntax of Postscript. The invention seeks to eliminate the undesirable effect of the appearance of cracks, or gaps between these segments.

Appendix A lists sample Postscript code generated by a Ceps2Ps function. This code contains examples of some polygon image segments, and in this sample they are rectangular.

A full description of the language is given, for example, in "PostScript Language Reference Manual", Second Edition, by Adobe System Incorporated, Addison-Wesley Publishing Company, ISBN 0-210-18127-4, herein named The Red Book.

Note that lines begin with the character '%' are comments in the language. Such lines do not translate to any image elements. Some comment lines are used herein to mark areas of interest within the Postscript code. Comments are described in Page 27 in Section 3.2.2 in The Red Book.

Under the line "% item 1" there is listed a first example of an image element composed of three rectangles. Note the use of the "setcmyktcolor" command explained in Page 496 in The Red Book, and the use of the "rectfill" command explained in Page 473 in The Red Book. Roughly explained, "setcmykcolor" specifies a color composed of cyan, magenta, yellow and black ink, and "rectfill" fills a rectangular shape with that color. Note that the first rectangle has no transparent colors at all, the second rectangle has one transparent color, and the third has two transparent colors.

Under the line "% item 2" there is listed a second example of an image element composed of two rectangles. Note that they are smaller in size relative to the rectangles described above.

SUMMARY OF THE INVENTION

A first preferred embodiment of the invention sets the size of the segments of like color in a given Ceps2ps operation to a minimum such as the size of one pixel in each of the two image dimensions. Therefore the image is made to be described as composed of a large number of segments, and each segment is small in size.

A second preferred embodiment of the invention increases the size of the segments of like color in a given Ceps2ps operation by a small amount such as the size of one in each of the two image dimensions. Therefore the number of segments describing an image does not change, but some segments are made to be a little larger.

A third preferred embodiment of the invention comprises two steps. The first step of the third preferred embodiment of the invention increases the size of the segments of like color in a given Ceps2ps operation by a small amount such as the size of one in each of the two image dimensions. The second step of the third preferred embodiment of the invention sorts the segments according to their color content. This step produces a list of segments in which the segments having a larger number of transparent separations are rendered before segments having a smaller number of transparent separations. Therefore the segments having a larger number of transparent separations are listed before segments having a smaller number of transparent separations, assuming that the PDL renders segments in the order in which they are listed.

A fourth preferred embodiment of the invention decompose segments of like color in a given Ceps2ps operation to core parts and border parts, and divides the border parts into segments of a small size such as the size of one pixel in each of the two image dimensions

BRIEF DESCRIPTION OF THE DRAWINGS

FIG. 6 described and example of color attributes of an image segments including the attribute of transparency, and including a calculated sum of the numerical color attributes over the separations or inks.

FIG. 7a depicts two of the three rotated and enlarged segments depicted in FIG. 3 and FIG. 4. The third rectangle is assumed to be a part of the image, but it is not drawn in FIG. 7a for clarity. Rotated rectangles 310 and 320 correspond to same shapes in FIG. 3. Enlarged and rotated rectangle 710 and 720 correspond to shapes 410 and 420 in FIG. 4 respectively. Comparing shapes 410 and 420 to shapes 710 and 720, it is seen that in FIG. 7a the enlargement does not include the boarder between image segments such as 310 and 320.

FIG. 7b depicts again shapes 310 and 320. It also shows enlarged area 720, but it does not show enlarge area 710 for clarity.

Small shapes 730, 740, 750, 760, 770, 780 and 790 are depicted at the border between shapes 310 and 320.

Figure 8:
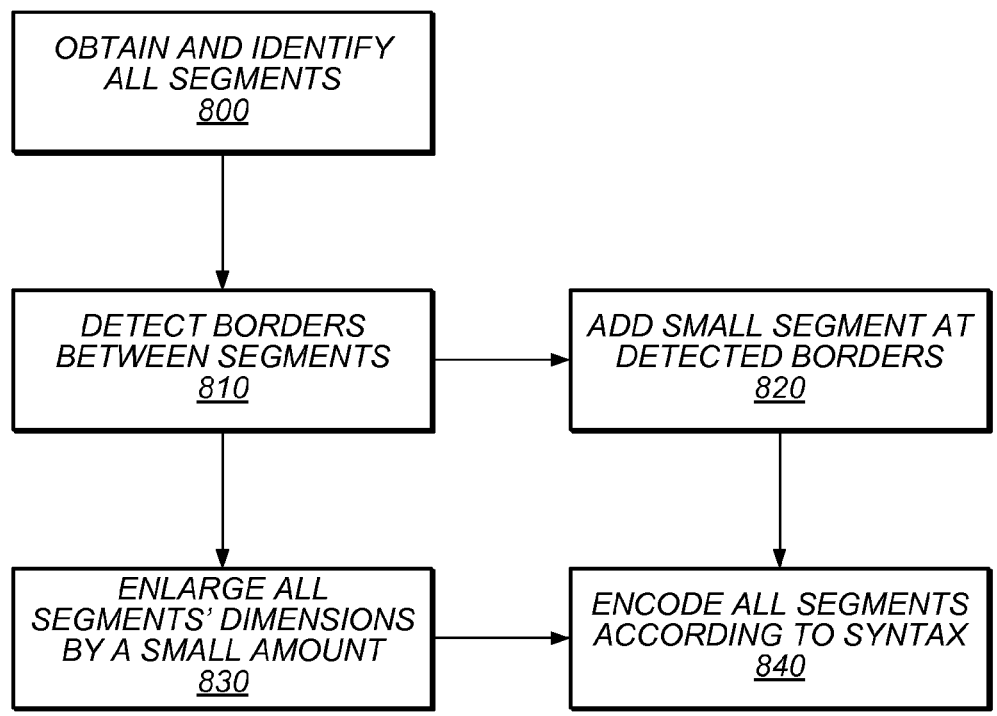

FIG. 8 depicts a Ceps2ps converter comprising of the following steps. Step 800 identifies the image segments that are continuous collections of raster image pixels. Step 810 detects the boarders between the image segments. Step 820 adds small image segments at the detected boarders. Step 830 enlarges the original segments by a small amount. There is no need to perform this enlargement at the detected boarders. Step 840 composes all image segments, added or enlarged, to a file in the syntax of the target language such as Postscript.

DESCRIPTION OF THE PREFERRED EMBODIMENTS

There are four embodiments of the invention presented here. They represent four possible solutions to the problem of the appearance of the undesirable artifacts by introducing changes to the Ceps2Ps operation. These embodiments are described below in reference to Appendix B. This appendix lists sample Postscript code for an image. It describes the image of Appendix A after processing according to the various embodiments of the present invention.

To explain the terms "OneDevicePixWidth" and "OneDevicePixHeight" in Appendix B, reference is first made to the code under the line "% item 0" therein. The two terms are defined as equivalent to one image pixel in the resolution of the target printing device. The size of one such pixel is used herein as the preferred small amount. In some embodiments it is used as the size of a small element, and in some embodiments it is used as the amount of change in a size of an element. It is appreciated that other similar sizes can serve for the same purpose. For example, the size of two pixels may be good enough for many practical purposes.

The four embodiments are also described in reference to figures. The first embodiment is described in reference to FIG. 2a, the second embodiment is described in reference to FIG. 3, the third embodiment is described in reference to FIG. 4, and the fourth embodiment is described in reference to FIGS. 7a and 7b.

Figure 1:
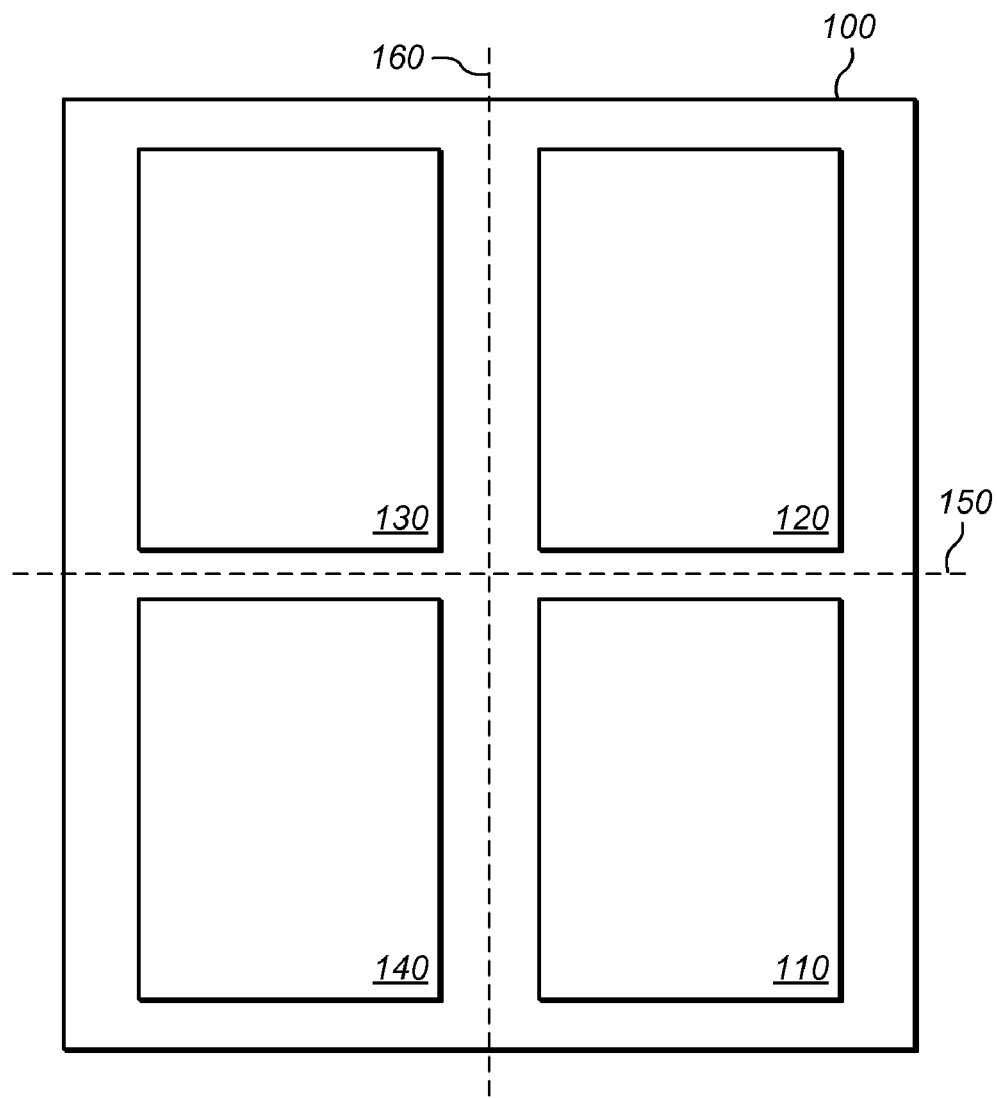
FIG. 1 depicts a relatively large sheet of paper 100, in which four relatively small distinct images 110, 120, 130 and 140 are printed. The sheet is then folder along dashed lines 150 and 160 (that are not necessarily actually printed on the paper) and folder to form a four page booklet. Some other four distinct images may be printed on the backside of the sheet of paper. The backside is not shown in the figure. The invention seeks to eliminate artifacts caused by the rotation at a small angle of images 110, 120, 130 and 140 relative to 100, 150, 160 and to each other.
Figure 2A:
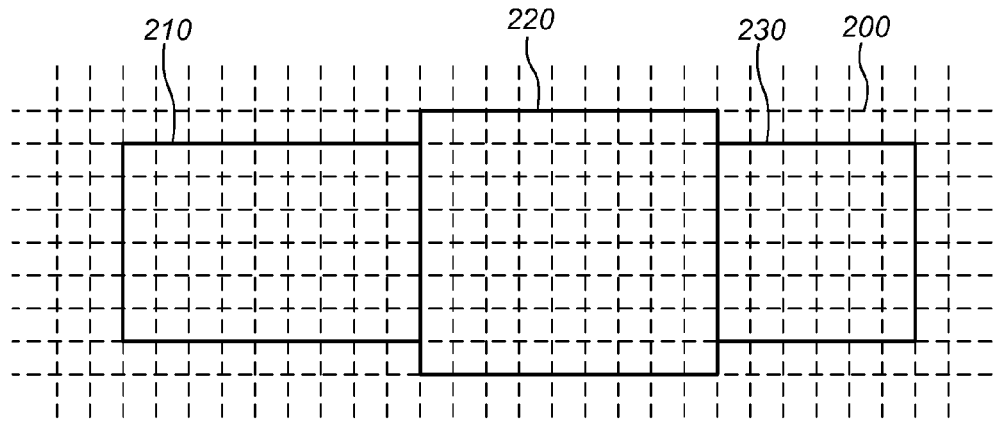
FIG. 2a depicts three rectangular segments 210, 220 and 230 that together form a continuous shape. The shape is depicted against a grid of dashed lines 200 that indicates individual pixels in a raster format. Grid 200 does not in itself get printed and is not an image element.
Figure 2B:
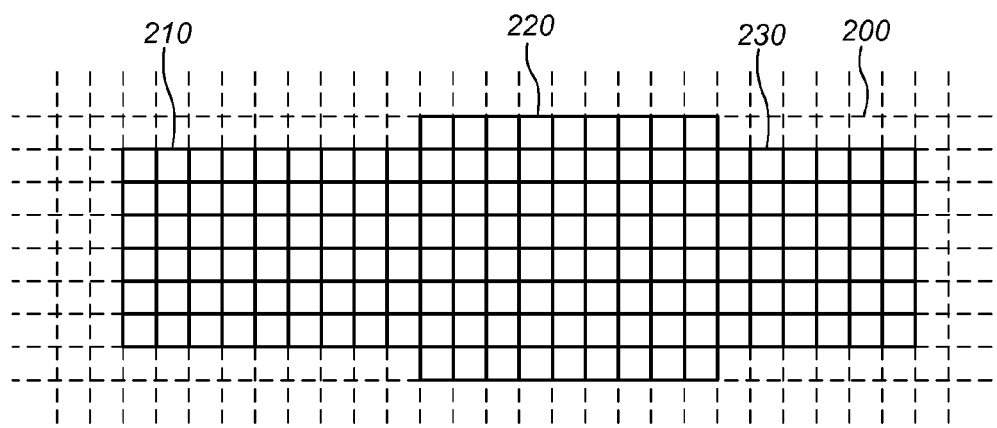
FIG. 2b decomposes the same three rectangular segments into squares of the size of one pixel.

The first preferred embodiment of the invention sets the size of the segments of like color in a given Ceps2ps operation to a minimum such as the size of one pixel in each of the two image dimensions. Where, for example, three rectangular segments are enough to express the image, as shown in FIG. 2a, a Ceps2ps function acting according to the first embodiment produces 6 times 9 plus 8 times 9 plus 6 times 6, or 162 rectangular segments, each approximately one pixel high and one pixel wide. Referring to Appendix B, the effects of the first preferred embodiment of the present invention can be observed in the image segments under the line "% item 2".

The two rectangle that are described under "% item 2" in Appendix A, are partially divided in Appendix B into small rectangles of a small size of one pixel in each dimension.

This embodiment avoids some problems that arise in the other embodiments, but it is costly in terms of computational resources. This may be the embodiment of choice in the future, as these resources become very cheap.

A second preferred embodiment of the invention increases the size of the segments of like color in a given Ceps2ps operation by a small amount such as the size of one in each of the two image dimensions.

Figure 3:
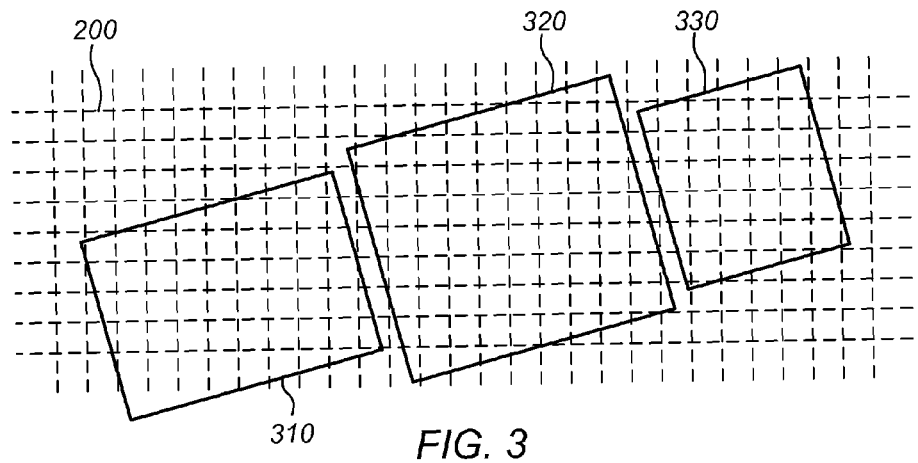
FIG. 3 depicts the same three rectangular segments depicted in FIG. 2, against the same Grid 200. The three rectangular segments are rotated in a small angle relative to Grid 200, and thus they form rotated shapes 310, 320 and 330 respectively. The angle of rotation is exaggerated in the figure relative to common practice. Usually the angle is actually small, but the figure shows it as big, for demonstration purpose only. Gaps are shown between 310 and 320, and between 320 and 330. These may lead to cracks in the image that are an undesirable effect caused by the RIP.

FIG. 3 depicts the situation without resorting to the invention. Gaps have formed between image rectangular segment 310 and 320, and between 320 and 330. These gaps are seldom larger than one pixel wide, but they are sometimes rendered and can be visible at the final printed product usually as cracks in dark colors behind which white or light color appears.

Figure 4:
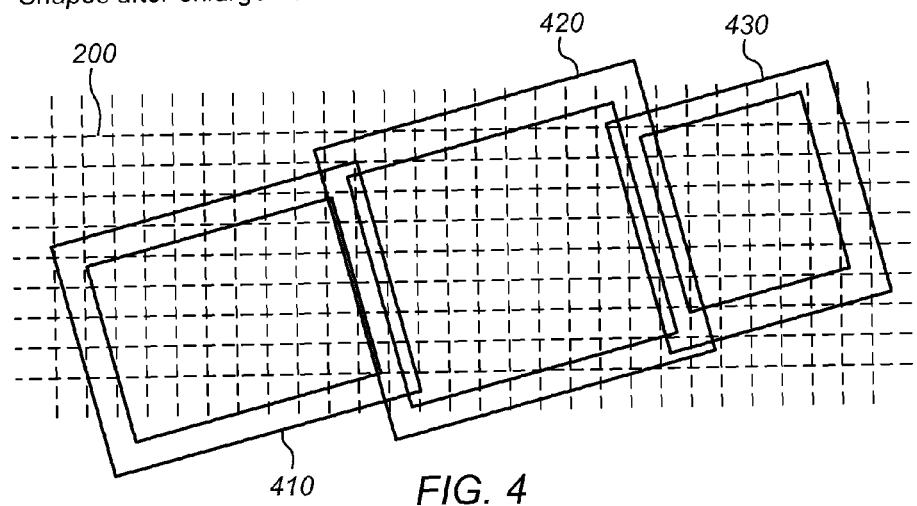
FIG. 4 depicts the same three rotated segments depicted in FIG. 3, against the same Grid 200. The three rectangular segments 410, 420, and 430 are larger by a small amount (about one pixel) then 310, 320 and 330, and so no gaps are present between them. Shapes 410, 420 and 430 correspond to 310, 320 and 330 respectively.

FIG. 4 explains how the second embodiment solves the problem by enlarging the segments to overlap and remove any chance of any apparent cracks in the final product. This causes some enlargement of the image feature described by the enlarged segments, but this enlargement is insignificant, and undetectable after rotation, as it is approximately one pixel wide. One method of enlargement is shown in Appendix B.

Referring to Appendix B, the effects of the second preferred embodiment of the present invention can be observed in the image segments under the line "% item 1". The three rectangles that are described under "% item 1" in Appendix A, are enlarged by a small amount of one pixel in each dimension. This is achieved using the Postscript commands "add" and "sub" for adding and subtracting an amount to and from the coordinates or size of a segment.

FIG. 6 aids in explaining a drawback of the second embodiment. Each image segment carries an attribute of color. Color is expressed as a set of numerical values corresponding to a set of inks or toners, or generally a set of separations to which the image is said to be separated. Some separations for some image segments may carry an attribute of transparency, indicating that the segment is not rendered but shows the underlying color in the specific transparent separation. FIG. 6 shows an example for color description of a segment. In this example the color description consists of four inks or separations named Cyan, Magenta, Yellow and Black. In this example the ink named cyan fully covers the underling media, so its ink coverage is 100%. In this example, the value 0 indicates no transparency, so the cyan ink is not transparent at all.

Also in the example described in FIG. 6, the inks named magenta and black do not fully cover the underling media. In this example, the value 1 indicates full transparency, so the magenta and black inks are transparent, and so their percentage of coverage is not reflected in the appearance of the resulting image.

Also in the example described in FIG. 6, the ink named yellow does not fully covers the underling media, and in fact it does not cover it at all. In this example is not transparent, and so its percentage of coverage is reflected in the appearance of the resulting image. In this case the color white may often be expected to be observed in the resulting image, where the relevant image segment is rendered, over any underlying color.

Finally, in FIG. 6, the total values may be calculated for an image segment over all its inks The calculation of the total coverage may not include transparent color. In this example the total of the transparency value is the number of transparent inks, which is 2.

The second preferred embodiment is less computationally expensive than the first, but it is not suitable to cases including much transparent color. The enlargement of segment does not remove the undesirable effect of cracks if the enlarged area is transparent.

A third preferred embodiment of the invention comprises of two steps. A first step of the third preferred embodiment of the invention increases the size of the segments of like color in a given Ceps2ps operation by a small amount such as the size of one pixel in each of the two image dimensions. A second step of the third preferred embodiment of the invention sorts the segments according to their color content. The second step produces a list of segments in which the segments having a larger number of transparent separations are listed before segments having a smaller number of transparent separations.

The first and second steps comprise necessary steps in the embodiment, but they need not be taken in any particular order.

According to a first variant of the third embodiment, the first is taken before the second step, so sorting according to color occurs only after all segments have been increased in size.

According to a second variant of the third embodiment, the first is taken after the second step, so sorting all segments according to color occurs before any segment has been increased in size According to a third variant of the third embodiment, the first and second steps are taken in parallel, so size enlargement occurs during sorting.

The first step of the third embodiment has been explained herein above in reference to FIG. 4.

Figure 5A:
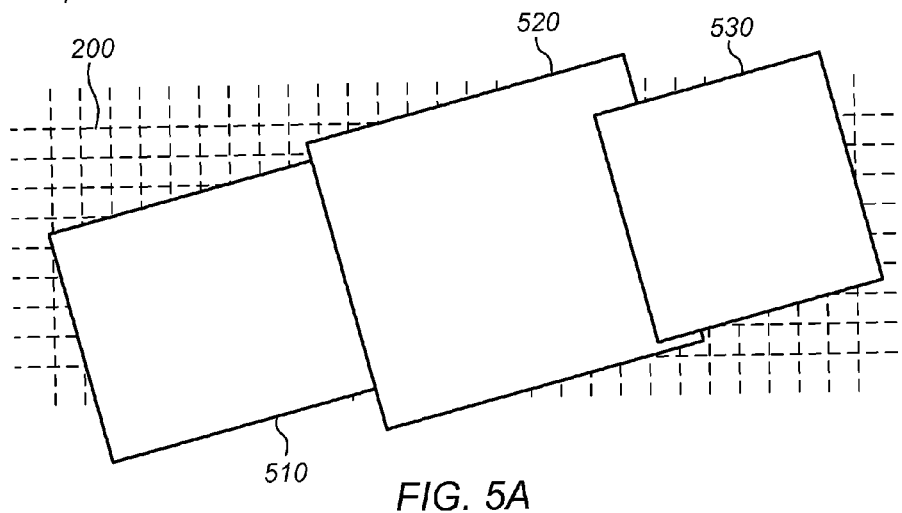
FIGS. 5a and 5b depict the same three rotated and enlarged segments depicted in FIG. 4, against the same Grid 200. The importance of order of rendering of segments is explained by comparing 5a to 5b. Shapes 510, 520 and 530 in FIG. 5a correspond to shapes 540, 550 and 560 in FIG. 5b, and also to shapes 410, 420 and 430 in FIG. 4 respectively.
Figure 5B:
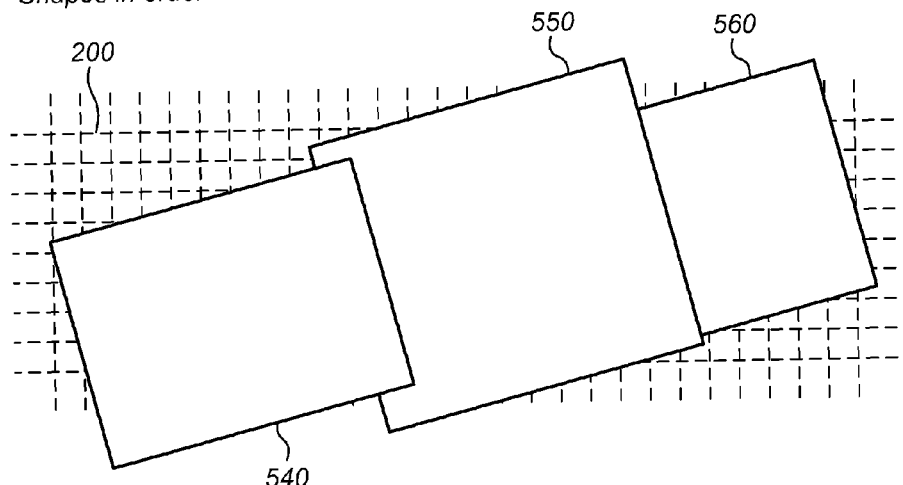

The second step is explained in reference to FIGS. 5a and 5b. It is a common and standard practice for a RIP to render shapes in the order in which they are present in the Postscript file that is processes to raster. When a first shape is recorded in the file before a second shape, then the second shape will be rendered on top of the first shape.

For example, and in reference to FIG. 5a, Shape 530 must a be recorded in the file after Shape 520 in order that Shape 530 be rendered as laying on top of Shape 520 as shown in FIG. 5a.

For example, and in reference to FIG. 5b, Shape 510 must a be recorded in the file after Shape 520 in order that Shape 510 be rendered as laying on top of Shape 520 as shown in FIG. 5b.

The third embodiment of the invention seeks to record image segments in some preferred order so that they are rendered in some preferred order.

A preferred order for rendering of image segments is any order that reduces the effect of the drawback of the second embodiment as explained herein above in reference to FIG. 6. The preferred order for rendering, according to the third embodiment of the invention is the order in which image segments having a large total transparency value, as defined in reference to FIG. 6, are rendered before image segments having a smaller total transparency value.

Referring to Appendix B, the effects of the third preferred embodiment of the present invention can be observed in the image segments under the line "% item 1".

The three rectangles that are described under "% item 1" in Appendix A, are enlarged by a small amount of one pixel in each dimension. The three rectangles appear in Appendix B in a particular order in which the rectangle having two transparent inks is listed first, and the rectangle having none is last. This is not their original order as in Appendix A, and so they have been sorted according to number of transparent inks.

By sorting image segments according to transparency, the third embodiment prevents most undesirable artifacts that are sometimes present with the second embodiment of the invention. The first embodiment prevents them all.

A fourth preferred embodiment of the invention decompose segments of like color in a given Ceps2ps operation to core parts and border parts, and divides the border parts into segments of a small size such as the size of one pixel in each of the two image dimensions.

Reference is now made to FIGS. 7a and 7b. A first step of the fourth embodiment of the present invention is the identification of borders between image segments. For example, the first step identifies the border between shapes 310 and 320.

A second step of the fourth embodiment of the present invention is the enlargement of the shapes. There is no need to enlarge the shapes at the borders between them. Therefore enlarged shapes 710 and 720 in FIG. 7a are smaller than enlarged shapes 410 and 420 in FIG. 4, and according to the second embodiment of the present invention.

A third step of the fourth embodiment of the present invention is the addition of small image segments along the boarders identified at the first step. For example, seven shapes: 730, 740 . . . 790 are added in FIG. 7b. Note that the shapes added at the second step roughly fill the are of the cross section of shapes 410 and 420 that represent the enlarged shapes according to the second embodiment of the present invention.

Referring to Appendix B, the effects of the fourth preferred embodiment of the present invention can be observed in the image segments under the line "% item 2".

To explain the terms "OneDevicePixWidth" and "OneDevicePixHeight" therein, reference is first made to the code under the line "% item 0" therein. The two terms are defined as equivalent to one image pixel in the resolution of the target printing device.

The two rectangle that are described under "% item 2" in Appendix A, are partially divided in Appendix B into small rectangles of a small size of one pixel in each dimension.

The small rectangles of Appendix B are marked only at the boarder between the two rectangles of Appendix A.

This embodiment avoids some problems that arise in the other embodiments, and it is not costly in terms of computational resources. This embodiment comprises a step of identification of boarders between shapes.

It is appreciated that an optimized Ceps2ps converter can be constructed that employs the fourth preferred embodiment of the present invention. This converter is a method or apparatus for the conversion of raster image to a vector image comprising the steps of detection of image segments among raster pixels of like color, detection of boarders between segments, and addition of small image segments along the detected boarders. It is depicted in FIG. 8.

Appendix A:Sample Postscript Code without Correction

```
% !PS
% Rectangles before anti-bottling artifacts treatment
true setoverprint
% item 1%
%Three adjacent rectangles set down in arbitrary order
% 0.0 color value is considered transparent
0.1 0.2 0.3 0.4 setcmykcolor
100 100 100 100 rectfill
0.0 0.1 0.2 0.3 setcmykcolor
100 200 100 100 rectfill
0.0 0.0 0.1 0.2 setcmykcolor
100 300 100 100 rectfill
% item 2%
%Two adjacent rectangles set down in arbitrary order
% 0.0 color value is considered transparent
0.0 0.1 0.2 0.3 setcmykcolor
300 100 4 4 rectfill
0.1 0.0 0.2 0.3 setcmykcolor
300 104 4 4 rectfill
showpage
```

Appendix B:Sample Postscript Code with Correction

```
% !PS
% Rectangles after anti-bottling artifacts treatment
% item 0%
%Calculation of 1 device space pixel (=1 output pixel)
/OneDevicePixWidth 1 1 idtransform pop def
/OneDevicePixHeight 1 1 idtransform exch pop def
true setoverprint
% item 1%
%The three adjacent rectangles set down by the pre-defined order
% end extended on all four sides by one output pixel
% 0.0 color value is considered transparent
0.0 0.0 0.1 0.2 setcmykcolor
100 OneDevicePixWidth sub 300 OneDevicePixHeight sub
100 OneDevicePixWidth add 100 OneDevicePixHeight add
   rectfill
0.0 0.1 0.2 0.3 setcmykcolor
100 OneDevicePixWidth sub 200 OneDevicePixHeight sub
100 OneDevicePixWidth add 100 OneDevicePixHeight add
   rectfill
0.1 0.2 0.3 0.4 setcmykcolor
100 OneDevicePixWidth sub 100 OneDevicePixHeight sub
100 OneDevicePixWidth add 100 OneDevicePixHeight add
   rectfill
% item 2%
%The two rectangles after adjacent edges split into 1.times.1
   rectangles
% and the two cores extended on all four sides by one output
   pixel
% 0.0 color value is considered transparent
% rectangle 1
0.0 0.1 0.2 0.3 setcmykcolor
300 OneDevicePixWidth sub 100 OneDevicePixHeight sub
4 OneDevicePixWidth add 4 rectfill
300 OneDevicePixWidth sub 104 OneDevicePixHeight sub
OneDevicePixWidth OneDevicePixHeight rectfill
301 OneDevicePixWidth sub 104 OneDevicePixHeight sub
OneDevicePixWidth One DevicePixHeight rectfill
302 OneDevicePixWidth sub 104 OneDevicePixHeight sub
OneDevicePixWidth OneDevicePixHeight rectfill
303 OneDevicePixWidth sub 104 OneDevicePixHeight sub
OneDevicePixWidth OneDevicePixHeight rectfill
304 OneDevicePixWidth sub 104 OneDevicePixHeight sub
OneDevicePixWidth OneDevicePixHeight rectfill
% rectangle 2
0.1 0.0 0.2 0.3 setcmykcolor
300 OneDevicePixWidth sub 104
4 OneDevicePixWidth add 4 OneDevicePixHeight add rectfill
300 OneDevicePixWidth sub 104
OneDevicePixWidth OneDevicePixHeight rectfill
301 OneDevicePixWidth sub 104
OneDevicePixWidth OneDevicePixHeight rectfill
```

```
302 OneDevicePixWidth sub 104
OneDevicePixWidth OneDevicePixHeight rectfill
303 OneDevicePixWidth sub 104
OneDevicePixWidth OneDevicePixHeight rectfill
304 OneDevicePixWidth sub 104
OneDevicePixWidth OneDevicePixHeight rectfill
showpage
```

What is claimed is:

1. A method comprising:
a computing device identifying segments of like color in a first raster image corresponding to a raster file accessible by the computing device; and
the computing device creating a vector image from the identified segments of like color.

2. The method of claim 1, further comprising:
the computing device rotating the vector image by a predetermined angle; and
the computing device converting the rotated vector image into a second raster image;
wherein a printed version of the second raster image is usable to reduce bottling artifacts.

3. The method of claim 2, further comprising printing the second raster image.

4. The method of claim 1, wherein the vector image is a Postscript image.

5. The method of claim 1, wherein each of the identified segments is smaller than a predetermined threshold.

6. The method of claim 2, wherein each of the identified segments is one pixel in size.

7. An article of manufacture including a computer-readable medium having instructions stored thereon that, if executed by a computing device, cause the computing device to perform a method comprising:
identifying segments of like color in a first raster image;
enlarging one or more of the identified segments by a predetermined amount; and
creating a vector image from the identified segments including the one or more enlarged segments.

8. The article of manufacture of claim 7, wherein the method further comprises:
rotating the vector image by a predetermined angle; and
converting the rotated vector image into a second raster image.

9. The article of manufacture of claim 8, wherein the method further comprises printing the second raster image.

10. The article of manufacture of claim 7, wherein the enlarged one or more segments are enlarged by a size of one pixel in height or width.

11. The article of manufacture of claim 7, wherein said creating includes storing information corresponding to each of the enlarged identified segments in a manner that determines the order in which the enlarged identified segments are to be rendered.

12. The article of manufacture of claim 11, wherein the information corresponding to each of the enlarged identified segments is stored in a manner that is based, at least in part, on a color content of each enlarged identified segment.

13. The article of manufacture of claim 11, wherein the information corresponding to each of the enlarged identified segments is stored in a manner that is based, at least in part, on a transparency of each enlarged identified segment.

14. The article of manufacture of claim 11, wherein the information corresponding to each of the enlarged identified segments is stored such that enlarged identified segments having a greater transparency are rendered prior to segments having a lesser transparency.

15. The article of manufacture of claim 7, wherein two or more of the enlarged identified segments overlap one another.

16. A method comprising:
a computing device identifying segments of like color in a first raster image;
the computing device decomposing at least one of the segments into a core segment and one or more border portions;
the computing device dividing the one or more border portions into a plurality of smaller border segments; and
the computing device creating a vector image that includes the core segment and the plurality of smaller border segments.

17. The method of claim 16, further comprising:
the computing device rotating the vector image by a predetermined angle; and
the computing device converting the rotated vector image into a second raster image.

18. The method of claim 16, further comprising printing the second raster image, and wherein the vector image is a page description language (PDL) image.

19. The method of claim 16, wherein each of the plurality of smaller border segments is a pixel in size.

20. The method of claim 16, further comprising the computing device enlarging the core segment, and wherein the vector image includes the enlarged core segment.

21. The method of claim 16, further comprising:
the computing device identifying a border between two or more of the identified segments; and
the computing device adding one or more smaller border segments along the border between the two or more segments.

* * * * *